United States Patent
Arethens

(10) Patent No.: US 7,218,278 B1
(45) Date of Patent: May 15, 2007

(54) PROCEDURE FOR GUIDING AN AIRCRAFT IN THE APPROACH PHASE AND CORRESPONDING GROUND BEACON

(75) Inventor: Jean-Pierre Arethens, Beaumont-les-Valence (FR)

(73) Assignee: Thales, Neuilly sur Seine (FR)

( * ) Notice: Subject to any disclaimer, the term of this patent is extended or adjusted under 35 U.S.C. 154(b) by 209 days.

(21) Appl. No.: 10/961,376

(22) Filed: Oct. 12, 2004

(30) Foreign Application Priority Data

Oct. 17, 2003 (FR) .................................. 03 12185

(51) Int. Cl.
*G01S 1/00* (2006.01)
(52) U.S. Cl. .............................. 342/367.03; 342/357.02
(58) Field of Classification Search ...............................
342/357.01–357.03, 454, 456; 701/120, 701/207, 214
See application file for complete search history.

(56) References Cited

U.S. PATENT DOCUMENTS 5,786,773 A 7/1998 Murphy 6,023,239 A 2/2000 Kovach
6,531,981 B1 3/2003 Fuller et al.

FOREIGN PATENT DOCUMENTS

DE 10141595 3/2003

*Primary Examiner*—Dao Phan
(74) *Attorney, Agent, or Firm*—Lowe Hauptman & Berner, LLP

(57) ABSTRACT

The invention relates to a procedure for guiding an aircraft in the approach phase comprising of receiving information on a predefined approach path, this information being contained in a message M4 originating from a ground beacon transmitting on the same transmission channel as that of a beacon of a GBAS type positioning accuracy augmentation system, receiving differential positioning radio satellite signals, and correction information from these satellite radio signals in the form of a message M1' originating from a ground central station of an SBAS type positioning accuracy augmentation system, via geostationary satellites of this augmentation system, calculating a corrected position based on the positioning signals and correction information, calculating an elevation and horizontal guidance deviation of the aircraft relative to the predefined approach path, based on the corrected position and information on the predefined approach path.

13 Claims, 5 Drawing Sheets

PROCEDURE FOR GUIDING AN AIRCRAFT IN THE APPROACH PHASE AND CORRESPONDING GROUND BEACON

RELATED APPLICATION

The present application is based on, and claims priority from, French Application No. FR 03/12185, filed Oct. 17, 2003, the disclosure of which is hereby incorporated by reference herein in its entirety.

BACKGROUND OF THE INVENTION

Field of the Invention

The invention relates to a procedure for guiding an aircraft in the approach phase and a ground beacon for implementing the procedure.

The field of the invention is that of the guidance of an aircraft in the approach phase.

The term final approach or precision approach is used to mean the guidance phase during which the aircraft is brought along a predetermined path and in well-defined conditions of visibility at a certain height relative to the landing runway. This approach is called category 1 when the aircraft is brought to 200 feet, category 2 when the aircraft is brought to 100 feet and category 3 if the aircraft is brought to 50 feet or less, as illustrated in FIG. 1.

Above 250 feet, it is considered a non-precision approach to which an elevation guidance corresponds.

Guidance in the final or non-precision approach phase is based on the use on the one hand of ground beacons and on the other hand of MMR (MultiMode Receiver) receiver on board the aircraft and receiving messages from these beacons. The MMR receiver is also linked to a differential positioning GNSS system. The ground beacons can be GBAS (Ground Based Augmentation System) or SBAS (Space Based Augmentation System) beacons.

The GBAS and SBAS systems are systems for augmenting the accuracy of the positioning obtained by the GNSS system.

The GBAS system is mainly intended for precision approaches as indicated in FIG. 1. As illustrated in FIG. 2a, it comprises a ground beacon subsystem GBAS-G and a receiver subsystem GBAS-A on board the aircraft. A GBAS ground beacon can be linked to an unlimited number of onboard receivers, included within its action radius. These ground beacons are installed according to requirements, they are typically located in airport areas. The GNSS system provides the aircraft and the ground beacons with information for calculating pseudo-ranges. The ground beacon provides the aircraft with:

data on the ideal approach paths for each landing runway in the form of Final Approach Segments (FAS), information for correcting pseudo-ranges (to correct atmospheric effects, multiple paths, etc.) and, information on the integrity of the differential positioning for each GNSS satellite in sight.

This data and information is used by the aircraft to determine more accurately its position relative to the approach path.

The SBAS system is mainly intended by non-precision approaches. As illustrated in FIG. 2b, it comprises an SBAS-G ground infrastructure. SBAS geo-stationary satellites designated SBAS-S and an SBAS-A receiver on board each aircraft. The SBAS-G ground infrastructure comprises:

a plurality of receiver stations distributed over a wide geographic area, which receive the data from the GNSS satellites and determine the pseudo-ranges, and a central control and processing station SC, which uses the pseudo-ranges transmitted by the receiver stations to determine the corrections and the integrity that are combined in an SBAS signal.

The SBAS-S satellites relay this SBAS signal from the central station to the aircraft receivers. The aircraft receiver uses this SBAS signal to determine the integrity of its position and improve its accuracy. Examples of SBAS systems include the European Global Navigation Overlay Service (EGNOS) system and the North American Wide Area Augmentation System (WAAS).

The MMR receiver on board the aircraft is designed to receive both the signals transmitted by the GBAS beacons and those transmitted by an SBAS-G central station and relayed by the SBAS-S satellites.

The GBAS beacons provide more accurate corrections than those of an SBAS central station. Furthermore, the GBAS beacons come under the authority of the air traffic control service which can thus control the transmission from these beacons according to the required integrity and precision of the position. Furthermore, the GBAS beacons provide, in addition to the corrections, ideal approach path (FAS) information.

The GBAS type ground beacons are therefore used for final approaches, whereas the SBAS (Space Based Augmentation System) type stations are used for non-precision approaches.

There now follows a more detailed description of the guidance of an aircraft in the context of a final approach.

In the final approach phase, the guidance is based on an ideal approach path and on the position of the aircraft relative to that path. The nearer the aircraft comes to the runway, the more accurate the position needs to be and the greater the integrity required.

The MMR receiver receives differential positioning satellite radio signals from the GNSS system; it also receives, from the beacons, the corrections applicable to these signals and information concerning the ideal paths. On instruction from the air traffic control service, the crew of the aircraft selects the desired ideal path and then the receiver calculates the guidance deviation between this ideal path and the corrected position of the aircraft. This guidance deviation is then transmitted to the automatic pilot which adjusts the path of the aircraft accordingly.

The corrections and the ideal path information come from the GBAS beacons. A GBAS ground beacon 100, as shown in FIG. 3, comprises a VHF transmitter 1 preceded by a data formatting element 10, linked to a device 2 designed to provide the ideal path (FAS) information that is transmitted by the transmitter 1 in the form of a message M4; the formatting element 10 is also linked to a device 3 designed to calculate the corrections that are transmitted by the transmitter 1 in the form of a message M1.

The device 2 comprises a database 21 containing the ideal paths for the landing runways. The ideal paths are transmitted to the transmitter 1 after formatting.

The device 3 comprises reference receivers designed to receive differential positioning satellite radio signals from the GNSS system, normally four receivers 31a, 31b, 31c, 31d respectively equipped with their antennas 32a, 32b, 32c, 32d. Each reference receiver calculates the corrections for all the satellites in sight. The device 3 also comprises a computer 33 which checks these corrections and eliminates the deviant measurements then calculates an average correction for all the satellites. These corrections are then transmitted to the transmitter 1 after formatting.

The beacon also preferably comprises a device 4 for controlling the transmission of the messages M1 and M4, also called a position monitor. It comprises receivers for differential positioning satellite radio signals from the GNSS system, for example two receivers 41a and 41b respectively equipped with their antennas 42a and 42b and which determine the position of the beacon and a VHF receiver 44 for the message M1 comprising the corrections. These corrections are supplied to the receivers 41a and 41b which determine the corrected position of the beacon. Moreover, the position of the beacon is known and stored in memory 47 in the beacon. A computer 43 calculates the difference between this known position and the corrected position to determine the integrity of the position calculation. The parameters representing the integrity are linked to the corrections in the message M1 so they can also be transmitted to the aircraft receiver.

This device 4 is linked to the air traffic control service 400 by wire or radio link: the messages M1 and M4 are transmitted under the authority of this service. When the integrity is sufficient, that is, greater than a value defined by this service, the messages M1 and M4 are transmitted by the transmitter 1; when it is not sufficient, a switch controlled by the computer 43 cuts off the transmission. This service can also decide to cut off the transmission typically in the case of wind, fog, etc., even when the integrity seems to be sufficient.

The aircraft which no longer receives these messages repeats its approach later or uses other means of approach.

The control device 4 preferably comprises more than one GNSS receiver on the one hand to reinforce the integrity and on the other hand so that, if one of the receivers fails, the other can take over.

An MMR receiver 200 on board the aircraft is diagrammatically represented in FIG. 4. It comprises various signal reception devices including a device 51 for receiving GBAS signals M1 and M4, a device 52 for receiving GNSS differential positioning signals designed also to receive the corrections M1 from the device 51 and to determine the corrected position of the aircraft, a computer 6 which uses the message M4 supplied by the device 51 and the corrected position CP supplied by the device 52 to determine the guidance deviation GD and transmits it to the automatic pilot 300. This guidance deviation GD includes the vertical deviation, the horizontal deviation and the distance between the aircraft and the next compulsory check-point.

The SBAS satellites have the same characteristics as the GNSS satellites. This is why the SBAS signal reception device 53 is part of the GNSS signal reception device 52. This SBAS signal reception device 53 is inactive in the final approach phase.

Conversely, in a non-precision approach phase, the device 51 is inactive whereas the device 53 is active and the device 52 determines the corrected position from the GNSS signals and the SBAS signal containing corrections in the form of a message M1' in a format different from that of M1. These corrections are virtually the same as those originating from a GBAS beacon. The device 52 then transmits the corrected position of the aircraft to the computer 6 which determines an elevation guidance deviation.

It is desirable to be able to guide an aircraft relative to a final approach path even when the latter is located above 200 feet, for example between 250 and 200 feet.

However, the GBAS beacons used on the final approach are expensive to buy and to maintain, particularly because of the cost of the GNSS receivers.

SUMMARY OF THE INVENTION

An important object of the invention is therefore to guide, relative to a final approach path, an aircraft located above 200 feet without using expensive ground beacons.

To achieve this object, the invention proposes a procedure for guiding an aircraft in the approach phase comprising the steps consisting in:

receiving information on a predefined approach path, this information being contained in a message M4 originating from a ground beacon transmitting on the same transmission channel as that of a beacon of a GBAS type positioning accuracy augmentation system.

receiving differential positioning satellite radio signals, and correction information for these satellite radio signals in the form of a message M1' originating from a ground central station of an SBAS type positioning accuracy augmentation system, via geostationary satellites of this augmentation system, calculating a corrected position based on positioning signals and correction information, calculating an elevation and horizontal guidance deviation of the aircraft relative to the predefined approach path, based on the corrected position and information on the predefined approach path.

The invention also relates to a ground beacon for implementing the procedure, comprising means 21 of storing information on predefined approach paths, means 10 of formatting this information in the form of a message M4, means 1 of transmitting the message M4 on the same transmission channel as that of a beacon of a GBAS type positioning accuracy augmentation system.

Such a beacon is obviously less expensive than that described in the preamble and the correction information is transmitted in the form of a message M1' by the SBAS central station which is already installed.

According to one characteristic of the invention, the ground beacon also comprises means 42a, 42b of receiving differential positioning satellite radio signals and of receiving correction information from these satellite radio signals, this information originating, via SBAS satellites, from a ground central station of an SBAS type positioning accuracy augmentation system, means 41a, 41b for determining the corrected position of the beacon based on satellite radio signals and correction information, means 47 of storing the known position of the beacon, means 43 for determining the integrity of the position calculation according to the corrected position and the known position and means 43 for controlling the transmission of the beacon based on the integrity.

BRIEF DESCRIPTION OF THE DRAWING

Other characteristics and advantages of the invention will emerge on reading the detailed description that follows, given by way of non-limiting example and with reference to the appended drawings in which.

DETAILED DESCRIPTION OF THE INVENTION

Figure 4:
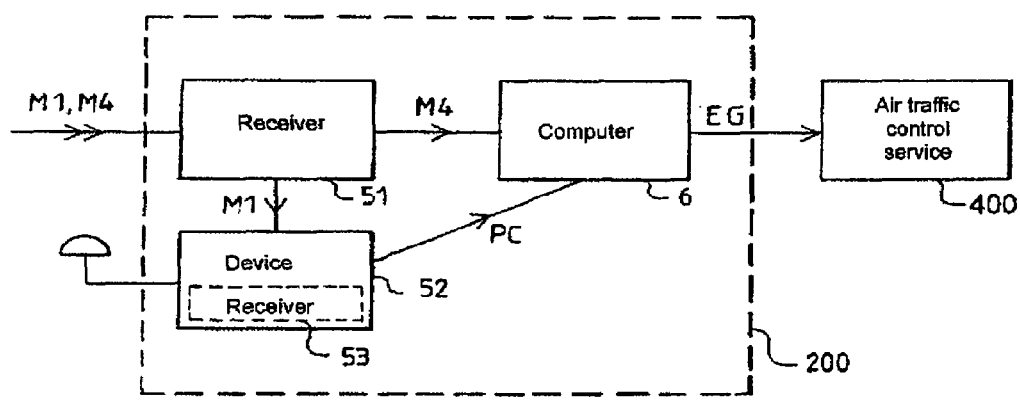
Figure 5:
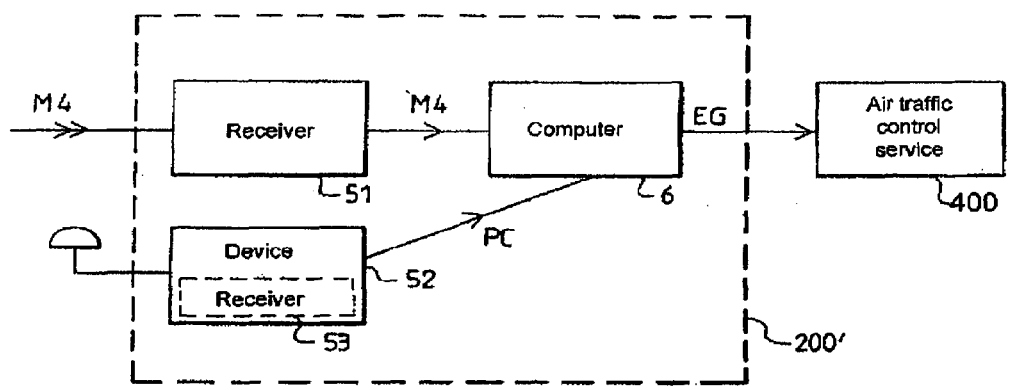

The MMR receiver on board the airplane represented in FIG. 5 comprises the same elements as those indicated in FIG. 4. However, its operation differs from that described in relation to that figure: the receiver 51 receives only the M4 type signals transmitted by a simplified GBAS beacon and transmits them as previously to the computer 6. The receiver 53, also active, receives, via the SBAS satellites, SBAS signals including the position correction information and the device 52 determines the corrected position CP of the aircraft and transmits it to the computer 6. According to this mode of operation of the MMR receiver, the reception devices 51 and 53 operate simultaneously.

Figure 1:
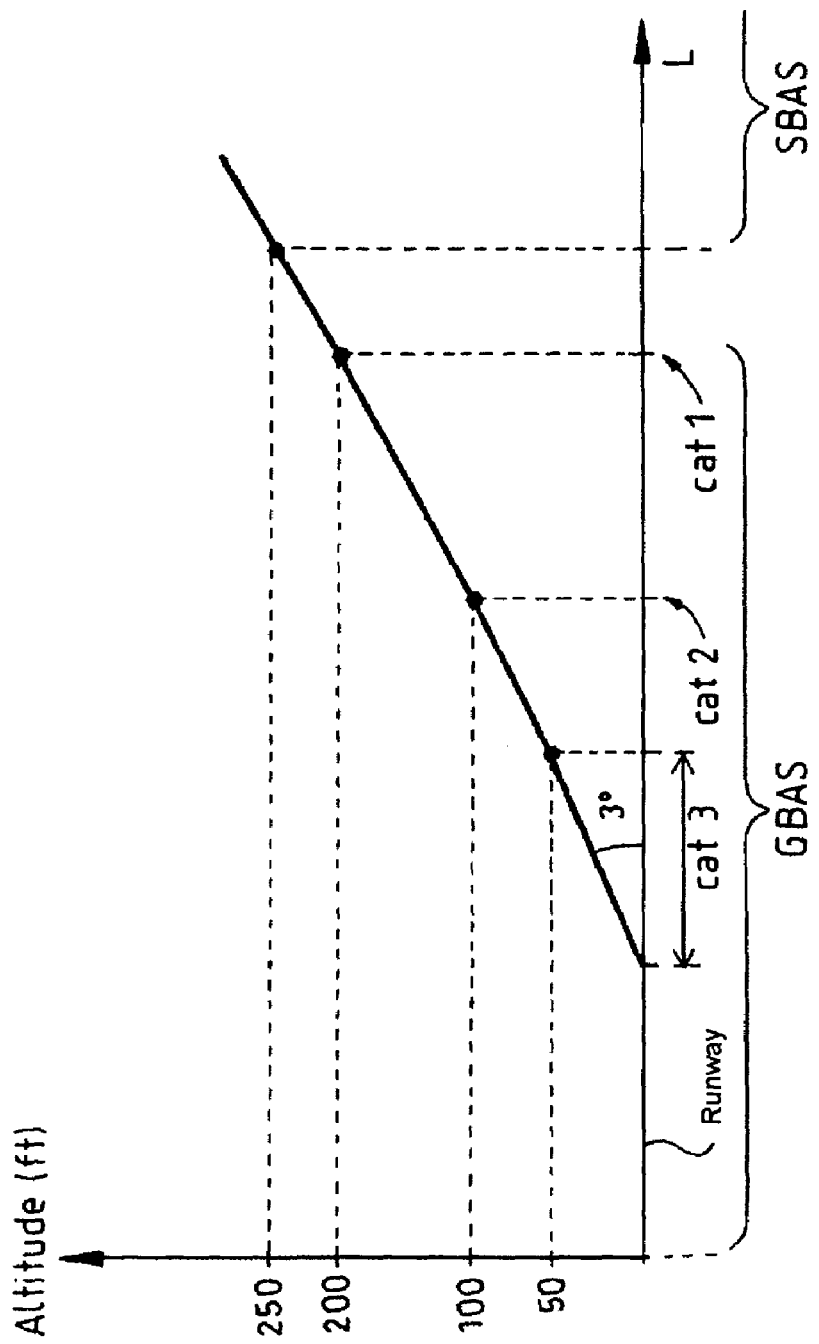
FIG. 1 already described diagrammatically represents an approach path, in the form of the altitude according to the distance relative to the runway, FIGS. 2a and 2b already described diagrammatically represent a GBAS (2a) and SBAS (2b) augmentation system, FIG. 3 already described diagrammatically represents a GBAS type ground beacon, FIG. 4 already described diagrammatically represents an MMR receiver on board an aircraft and its operation, FIG. 5 diagrammatically represents an MMR receiver on board an aircraft and its operation according to the invention, FIG. 6 diagrammatically represents a ground beacon according to the invention.
Figure 2A:
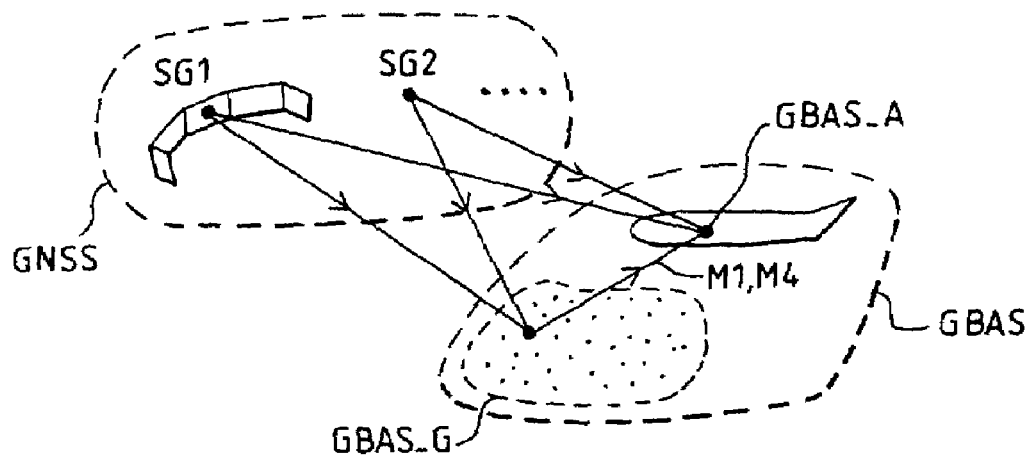
Figure 2B:
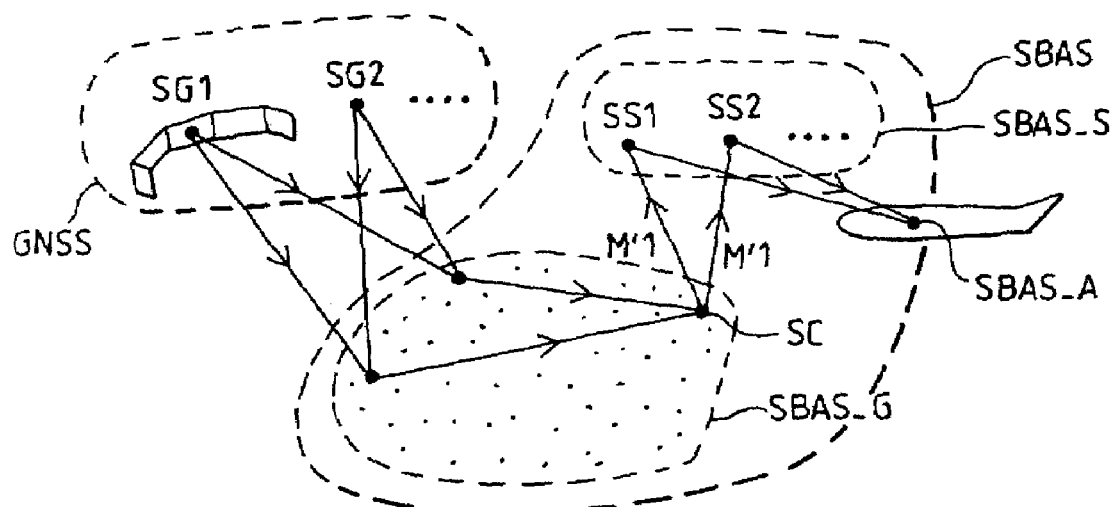
Figure 3:
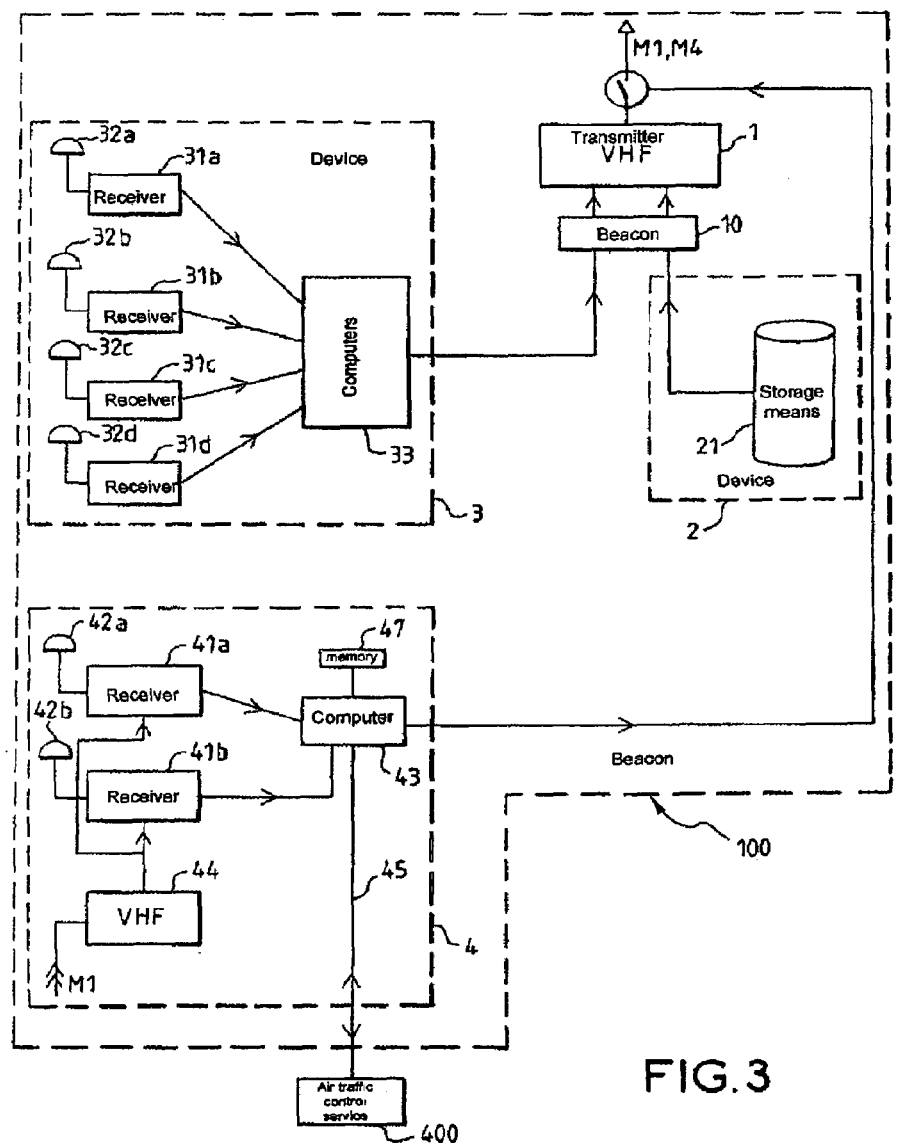
Figure 6:
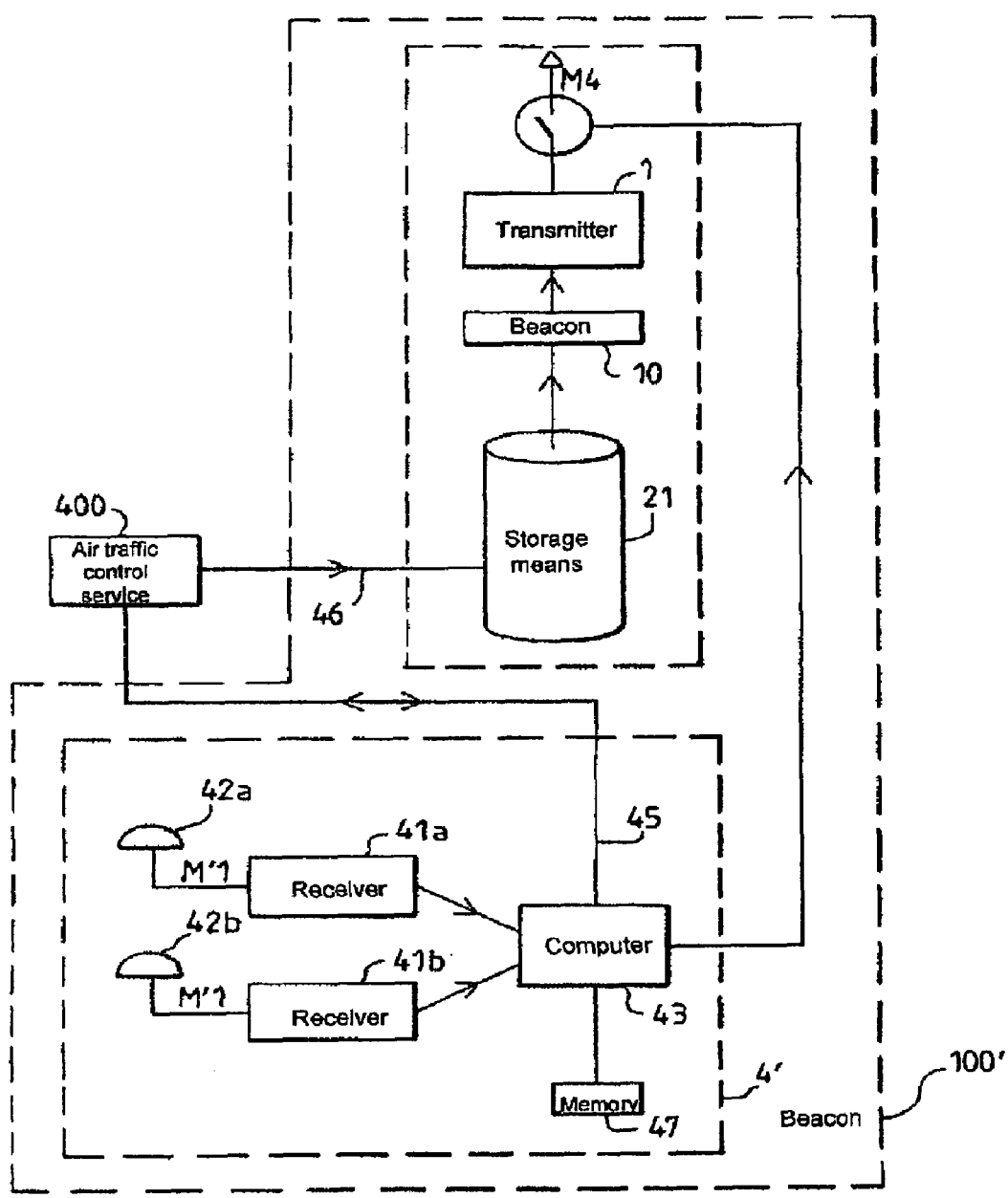

The ground beacon 100' according to the invention is a simplified GBAS type beacon, as represented by FIG. 6. It does not include, as represented in FIG. 3, the device 3 designed to calculate the corrections that are transmitted by the transmitter 1 in the form of a message M1. It comprises the device 2 designed to supply the ideal path information that is transmitted by the transmitter 1 in the form of a message M4. The M4 type message is thus transmitted over the same VHF transmission channel as a conventional GBAS beacon. The crew of the aircraft selects the desired ideal path, on instruction from the air traffic control service.

According to another embodiment of the beacon 100', the desired ideal path is selected at beacon level on instruction from the air traffic control service 400: the message M4 then does not include the other paths. The instruction from the air traffic control service passes over a link 46 between the storage means 21 and the service 400. This can be a wire or radio link.

Such a beacon is obviously less expensive than that described in the preamble and the correction information is sent in the form of a message M1' by the SBAS central station which is already installed.

This beacon 100' advantageously includes a device 4' for controlling the transmission of the M4 type message by the air traffic control service 400. This device 4', also called a position monitor, is linked to the air traffic control service 400 by a wire or radio link 45. It comprises at least one receiver, typically two receivers 41a and 41b for differential positioning satellite radio signals from the GNSS system and SBAS signals comprising, in the form of a message M1', the corrections transmitted by the SBAS central station via the SBAS satellites. These receivers are respectively equipped with an antenna 42a and 42b. Each receiver 41a, 41b determines the corrected position of the beacon from the positioning signals and corrections. Moreover, the position of the beacon is known and stored in memory in the beacon. A computer 43 calculates the difference between this known position and the corrected position to determine the integrity of the position calculation. When the integrity is sufficient, that is, when the parameters representing the integrity exceed a threshold predefined by the air traffic control service, the message M4 is transmitted by the transmitter 1; when it is not sufficient, a switch cuts off the transmission.

The air traffic control service receives various parameters including the parameters representing integrity. It can also decide to cut off transmission for example in the case of wind, fog, etc., even when the integrity seems to be sufficient. Finally, the transmission can be cut off automatically or on intervention from this service.

The GNSS system can be the GPS system, the GALILEO system, the GLONASS system or any other satellite positioning system.

The aircraft is typically an airplane or a helicopter.

The invention claimed is:

1. A method of guiding an aircraft in the approach phase comprising the steps consisting for the aircraft in:

receiving information on a predefined approach path, this information being contained in a message M4 originating from a ground beacon transmitting on a same transmission channel as that of a beacon of a GBAS type positioning accuracy augmentation system;

receiving differential positioning satellite radio signals, and correction information from the satellite radio signals in the form of a message M1' originating from a ground central station of an SBAS type positioning accuracy augmentation system, via geostationary satellites of this augmentation system; and calculating a corrected position based on positioning signals and correction information, calculating an elevation and horizontal guidance deviation of the aircraft relative to the predefined approach path, based on the corrected position and information on the predefined approach path.

2. The method of claim 1, comprising:

means of storing information on predefined approach paths, means of formatting the information in the form of a message M4, means of transmitting the message M4 on the same transmission channel as that of a beacon of a GBAS type positioning accuracy augmentation system.

3. The method of claim 2, also comprising means of receiving differential positioning satellite radio signals and of receiving correction information from the satellite radio signals, the information originating, via SBAS satellites, from a ground central station of an SBAS type positioning accuracy augmentation system, means for determining the corrected position of the beacon based on satellite radio signals and correction information, means of storing the known position of the beacon, means for determining the integrity of the position calculation according to the corrected position and the known position, and means of controlling the transmission of the beacon based on the integrity.

4. The method of claim 3, which comprises a link between the means of controlling the transmission of the beacon and an air traffic control service so that the transmission of the beacon can be controlled by the air traffic control service.

5. The method of claim 2, comprising a link between the means of storing information on approach paths and an air traffic control service so that a predefined path can be selected from the stored paths.

6. The method of claim 3, comprising a link between the means of storing information on approach paths and an air traffic control service so that a predefined path can be selected from the stored paths.

7. The method of claim 4, comprising a link between the means of storing information on approach paths and an air traffic control service so that a predefined path can be selected from the stored paths.

8. A ground beacon comprising:
means of storing information on predefined approach paths,
means of formatting the information in the form of a message M4,
means of transmitting the message M4 on the same transmission channel as that of a beacon of a GBAS type positioning accuracy augmentation system,
means of receiving differential positioning satellite radio signals and of receiving correction information from the satellites radio signals, the information originating, via SBAS satellites, from a ground central station of an SBAS type positioning accuracy augmentation system,
means for determining the corrected position of the beacon based on satellite radio signals and correction information,
means of storing the known position of the beacon,
means for determining the integrity of the position calculation according to the corrected position and the known position, and
means of controlling the transmission of the beacon based on the integrity.

9. The ground beacon of claim 8, wherein a ground station comprises a guiding aircraft in the approach phase:
receiving information means on a predefined approach path, the information being contained in a message M4 originating from a ground beacon transmitting on the same transmission channel as that of a beacon of a GBAS type positioning accuracy augmentation system;
receiving means for receiving differential positioning satellite radio signals, and correction information from the satellite radio signals in the form of a message M1' original from a ground central station of an SBAS type positioning accuracy augmentation system, via geostationary satellites of this augmentation system;
calculating means for calculating a corrected position based on positioning signals and correction information; and
calculating means for calculating an elevation and horizontal guidance deviation of the aircraft relative to the predefined approach path, based on the corrected position and information on the predefined approach path.

10. The ground beacon as claimed in claim 8, which comprises a link between the means of controlling the transmission of the beacon and an air traffic control service so that the transmission of the beacon can be controlled by the air traffic control service.

11. The ground beacon as claimed in claim 8, which comprises a link between the means of storing information on approach paths and an air traffic control service so that a predefined path can be selected from the stored paths.

12. The ground beacon as claim in claim 8, which comprises a link between the means of storing information on approach paths and an air traffic control service so that a predefined path can be selected from the stored paths.

13. The ground beacon as claimed in claim 10, means of storing information on predefined approach paths,
means of formatting the information in the form of a message M4,
means of transmitting the message M4 on the same transmission channel as that of a beacon of a GBAS type positioning accuracy augmentation system.

* * * * *